United States Patent
Chen et al.

(10) Patent No.: US 7,953,279 B2
(45) Date of Patent: May 31, 2011

(54) COMBINING ONLINE AND OFFLINE RECOGNIZERS IN A HANDWRITING RECOGNITION SYSTEM

(75) Inventors: Xinjian Chen, Beijing (CN); Dongmei Zhang, Redmond, WA (US); Yu Zou, Beijing (CN); Ming Chang, Beijing (CN); Shi Han, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 11/823,644

(22) Filed: Jun. 28, 2007

(65) Prior Publication Data

US 2009/0003706 A1   Jan. 1, 2009

(51) Int. Cl.
*G06K 9/00* (2006.01)
*G06F 17/00* (2006.01)

(52) U.S. Cl. .......... 382/187; 382/155; 706/20; 715/268

(58) Field of Classification Search .................. 382/101, 382/102, 155–161, 181–231; 706/20; 715/268
See application file for complete search history.

(56) References Cited

U.S. PATENT DOCUMENTS

| | | | |
|---|---|---|---|
| 4,024,500 A * | 5/1977 | Herbst et al. | 382/178 |
| 4,760,604 A * | 7/1988 | Cooper et al. | 382/155 |
| 5,245,696 A | 9/1993 | Stork et al. | |
| 5,319,721 A * | 6/1994 | Chefalas et al. | 382/160 |
| 5,438,631 A * | 8/1995 | Dai | 382/197 |
| 5,854,855 A * | 12/1998 | Errico et al. | 382/187 |
| 6,111,985 A * | 8/2000 | Hullender et al. | 382/229 |
| 6,516,309 B1 | 2/2003 | Eberhart et al. | |
| 6,603,881 B2 * | 8/2003 | Perrone et al. | 382/186 |
| 7,031,530 B2 * | 4/2006 | Driggs et al. | 382/228 |
| 7,080,053 B2 | 7/2006 | Adams et al. | |
| 7,120,533 B2 | 10/2006 | Cesario et al. | |
| 7,177,743 B2 | 2/2007 | Roy | |
| 2003/0055654 A1 | 3/2003 | Oudeyer | |

(Continued)

FOREIGN PATENT DOCUMENTS

WO   2005020044 A1   3/2005

OTHER PUBLICATIONS

Burgin, et al., "Evolutionary Optimization in an Algorithmic Setting", pp. 1-33, Nov. 16, 2006.
Iget, et al., "Using Fitness Distributions to Improve the Evolution of Learning Structures", pp. 1-8, 1999.
Jang, Jun-Su, "Fast and Robust Face Detection using Evolutionary Pruning", pp. 1-31, 2006.

(Continued)

*Primary Examiner* — Manav Seth
(74) *Attorney, Agent, or Firm* — L. Alan Collins; Collins & Collins Incorporated

(57) ABSTRACT

Described is a technology by which online recognition of handwritten input data is combined with offline recognition and processing to obtain a combined recognition result. In general, the combination improves overall recognition accuracy. In one aspect, online and offline recognition is separately performed to obtain online and offline character-level recognition scores for candidates (hypotheses). A statistical analysis-based combination algorithm, an AdaBoost algorithm, and/or a neural network-based combination may determine a combination function to combine the scores to produce a result set of one or more results. Online and offline radical-level recognition may be performed. For example, a HMM recognizer may generate online radical scores used to build a radical graph, which is then rescored using the offline radical recognition scores. Paths in the rescored graph are then searched to provide the combined recognition result, e.g., corresponding to the path with the highest score.

20 Claims, 6 Drawing Sheets

U.S. PATENT DOCUMENTS

2004/0010480 A1 1/2004 Agnihotri et al.
2005/0049983 A1 3/2005 Butler et al.
2006/0062467 A1 3/2006 Zou et al.
2010/0128985 A1* 5/2010 El-Sana et al. ................ 382/189

OTHER PUBLICATIONS

Stanley, et al., "Neuroevolution of an Automobile Crash Warning System", Date: Jun. 2005, pp. 1-8.

* cited by examiner

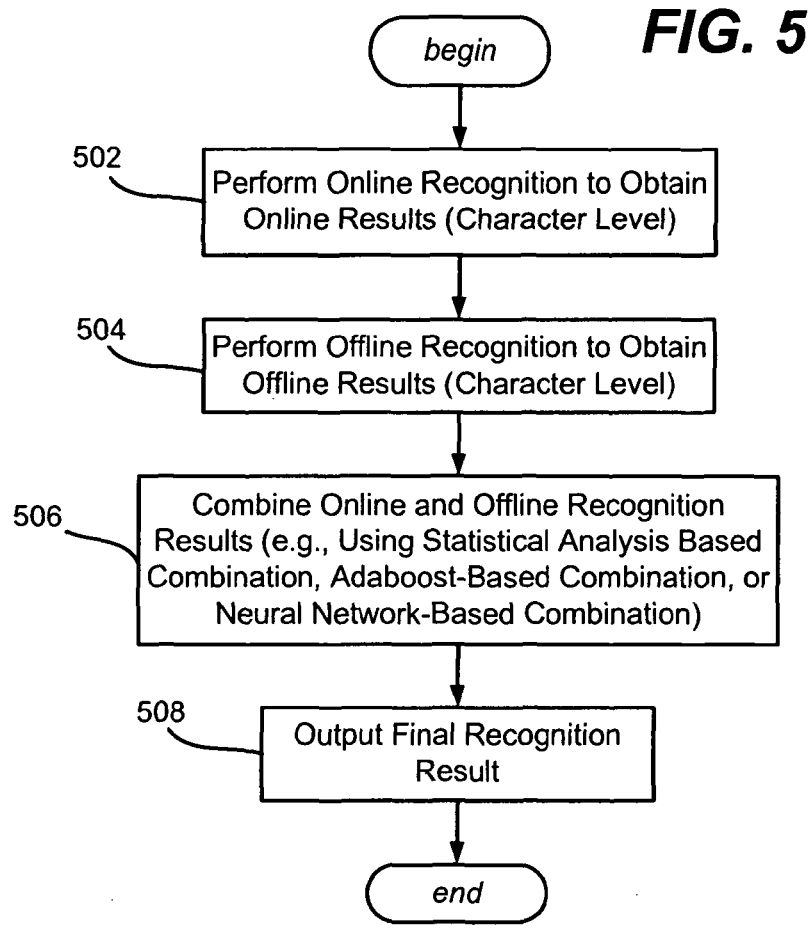
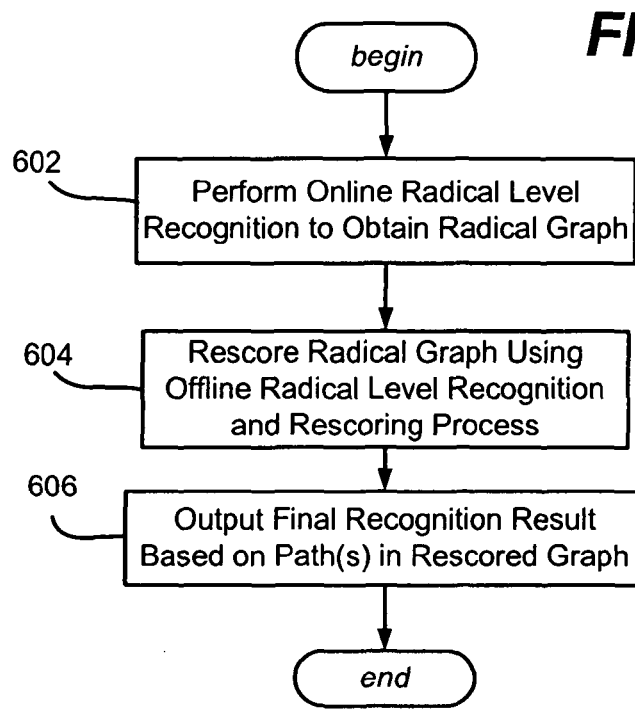

COMBINING ONLINE AND OFFLINE RECOGNIZERS IN A HANDWRITING RECOGNITION SYSTEM

BACKGROUND

To recognize a handwritten input character, various types of recognition models may be applied for classification purposes, such as an online recognition model (e.g., a Hidden Markov Model) or an offline recognition model (e.g., a statistical template-based model).

However, different error sets result from different types of recognition models. As a result, while both types of recognition models provide very good classification performance, the models have different error cases on a given dataset and thus the recognition accuracy suffers to an extent depending on the dataset.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which online recognition of handwritten input data is combined with offline recognition, to obtain a combined recognition result. In general, the combination improves overall recognition accuracy.

In one aspect, online recognition and offline recognition are separately performed to obtain character-level online and offline recognition result sets. The online and offline recognition result sets are combined to obtain the combined recognition result. For example, the online recognizer produces online hypotheses, each having a score; the offline recognizer produces offline hypotheses, each having a score. A statistical analysis-based combination combines the scores to determine similarities to the handwritten input. Alternatively, (or in addition to), the online and offline scores for the handwritten input may be considered as features, to which an AdaBoost algorithm is applied to produce a combination function in feature space composed of online and offline scores to combine the online scores with the offline scores. Alternatively, (or in addition to), the online and offline scores are combined using neural network-based combination, e.g., by applying a back propagation algorithm.

In one aspect, combining online recognition with offline processing comprises performing online recognition to obtain radical level online recognition data, which is then used in a radical graph. Offline recognition processing uses radical level offline recognition data on the online recognition data to obtain the combined recognition result. For example, a HMM recognizer may generate a radical graph that an offline process processes by rescoring the radical graph with offline radical level data to obtain the combined recognition result.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 5 is a flow diagram representing example steps taken to combine online and offline recognition models using statistical analysis based combination, AdaBoost-based combination, or neural network-based combination.

FIG. 6 is a flow diagram representing example steps taken to combine online and offline recognition models using graph-based combination.

DETAILED DESCRIPTION

Various aspects of the technology described herein are generally directed towards improving handwritten input (including one or more characters, symbols, gestures, shapes, equations and so forth) recognition performance by combining offline and online recognition models, particularly (but not necessarily) for use in recognizing Eastern Asian (EA) characters. In one set of examples, to achieve higher recognition accuracy, a Hidden Markov Model was used as the online recognition model, and was combined with an offline recognition model comprising statistical analysis-based model, an AdaBoost-based model, a neural network-based model, and/or a graph based model.

As will be understood, however, these are only example models that may be combined, and other models are similarly combinable. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and character recognition technology in general.

Figure 1:
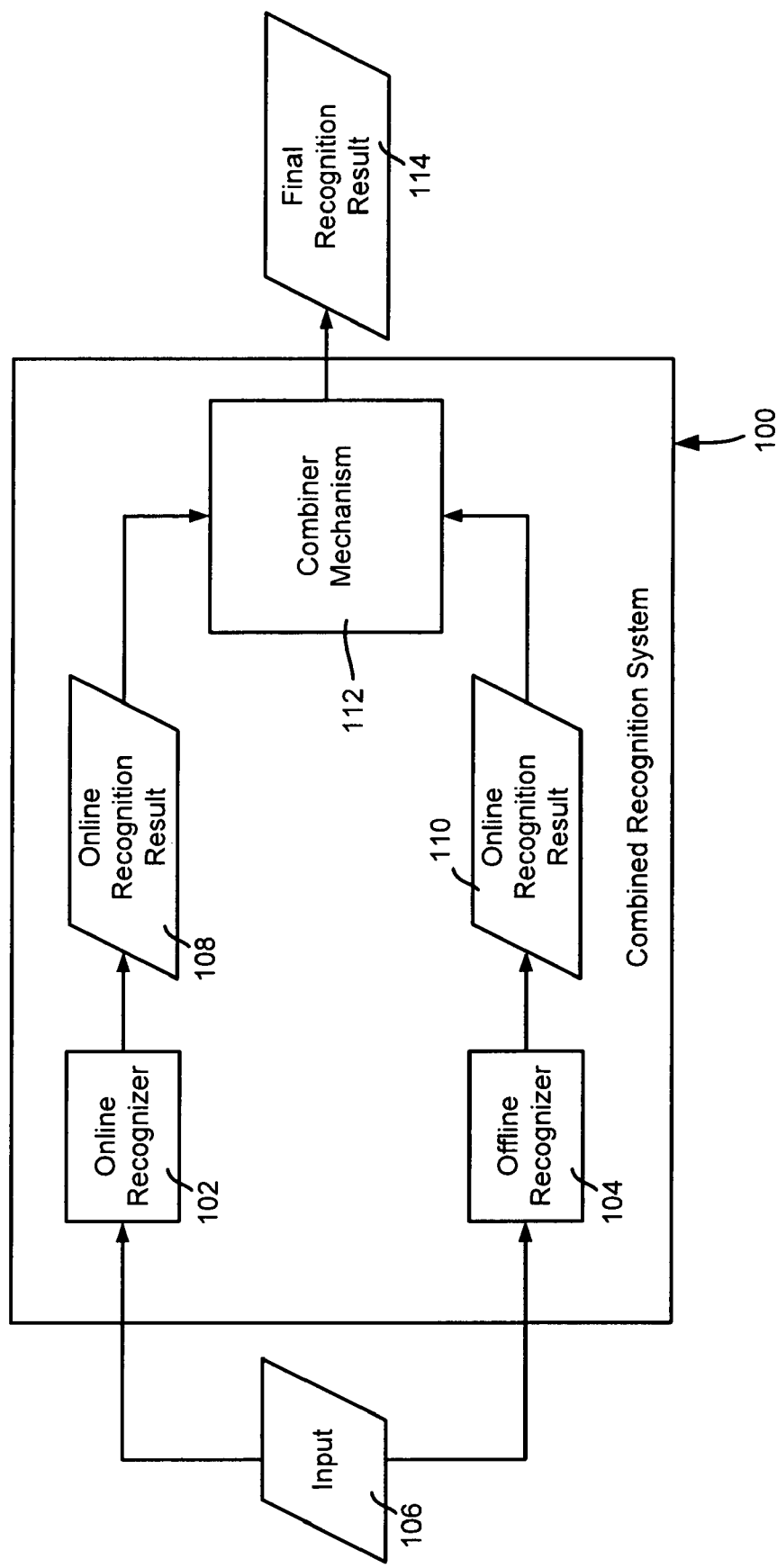
FIG. 1 shows an illustrative block diagram example of a system for combining offline and online recognition results using statistical analysis based combination, AdaBoost-based combination, or neural network-based combination.

FIG. 1 shows the general concept of one example type of combined recognition system 100, in which an online recognition model (recognizer) 102 and an offline recognition model (recognizer) 104 are combined to achieve better recognition (classification) performance. In general, given an input character 106, the online recognizer 102 recognizes the input as an online recognition result 108 separately from the offline recognizer 104, which provides its own offline recognition result 110.

As set forth below, one or more of various combiner algorithms are used as a combiner mechanism 112 to combine the recognition results 108 and 110 into a final recognition result (classification) 114. Note that the recognition results need not necessarily be in the form of a recognized character, but may include various scoring and other data (features) of the input character that may be used during the combination process.

For example, for an input character ⺽, the recognition results are as follows:

Offline results are set forth in the following table, in which the smaller the score, the more similar the input character is to the recognition hypothesis:

Online results are set forth in the following table, in which the higher the score is, the more similar the input character is to the recognition hypothesis:

| hypotheses | | scores |
|---|---|---|
| Top1 | 上 | 299.776825 |
| Top2 | 土 | 360.055176 |
| Top3 | 止 | 395.169220 |
| Top4 | 工 | 395.681610 |
| Top5 | 之 | 409.075226 |
| Top6 | 三 | 415.944855 |
| Top7 | 尸 | 417.508453 |
| Top8 | 云 | 426.750671 |
| Top9 | 大 | 427.738159 |
| Top10 | 幺 | 431.765106 |

Online results are set forth in the following table, in which the higher the score is, the more similar the input character is to the recognition hypothesis:

| hypotheses | | scores |
|---|---|---|
| Top1 | 上 | −6.887748 |
| Top2 | 丘 | −7.297907 |
| Top3 | 口 | −7.433957 |
| Top4 | 仁 | −7.599403 |
| Top5 | 且 | −7.630971 |
| Top6 | 止 | −7.700678 |
| Top7 | 亙 | −7.730252 |
| Top8 | 丹 | −7.891527 |
| Top9 | 五 | −7.921412 |
| Top10 | 臼 | −8.128083 |

If S is the recognition score, the score normalization $S_n$ is defined as follows:

$$S_n = \frac{S - S_{\min}}{S_{\max} - S_{\min}}$$

where $S_{min}$ is the minimal score, $S_{max}$ is the maximal score in the recognition score results.

The following table shows the combined results using a statistical analysis-based combination method (product rule); the smaller the score, the more similar the input character is to the recognition hypothesis:

| hypotheses | | scores |
|---|---|---|
| Top1 | 上 | 0.316077 |
| Top2 | 止 | 0.382694 |
| Top3 | 二 | 0.579777 |
| Top4 | 丘 | 0.592984 |
| Top5 | 工 | 0.595682 |
| Top6 | 口 | 0.605659 |
| Top7 | 之 | 0.609075 |
| Top8 | 三 | 0.615945 |
| Top9 | 尸 | 0.617509 |
| Top10 | 云 | 0.626751 |

For example, as set forth below, a score may be provided for the N-best hypotheses. Then the online and offline scores are combined by an algorithm, with the recognition result coming out of the best hypothesis.

A first such example algorithm used as the combiner mechanism comprises a statistical analysis-based combination process. A statistical analysis-based combination process is set forth below:

Suppose $S_1$ is the normalized score of online recognition and $S_2$ is the normalized score of offline recognition. Fuzzy features are used to represent $S_1$ and $S_2$. Each character is associated with a fuzzy feature that assigns a value (between 0 and 1) to each feature vector in the feature space. A fuzzy feature $\tilde{F}$ on the feature space $\Re$ is defined by a mapping $\mu_{\tilde{F}}$: $\Re \rightarrow [0,1]$ named as the membership function.

For any feature vector $\vec{f} \in \Re$, the value of $\mu_{\tilde{F}}(\vec{f})$ is called the degree of membership of $\vec{f}$ to the fuzzy feature $\tilde{F}$. When the value of $\mu_{\tilde{F}}(\vec{f})$ is closer to 1, the input character is more similar to the template character. For the fuzzy feature $\tilde{F}$, there is a smooth transition for the degree of membership to $\tilde{F}$ besides the hard cases $\vec{f} \in \tilde{F}(\mu_{\tilde{F}}(\vec{f})=1)$ and $\vec{f} \notin \tilde{F}(\mu_{\tilde{F}}(\vec{f})=0)$. A fuzzy feature degenerates to a conventional feature set if the range of $\mu_{\tilde{F}}$ is $\{0,1\}$ instead of $[0,1]$.

Building or choosing a proper membership function is an application-dependent issue; commonly-used membership functions are cone, exponential, and Cauchy functions. In one example implementation, the Cauchy function is used due to its good expressiveness and high-computational efficiency.

The Cauchy function: $C:\Re^k \rightarrow [0,1]$, is defined as:

$$C(\vec{x}) = \frac{1}{1 + \left(\frac{\|\vec{x} - \vec{v}\|}{d}\right)^\alpha}$$

where $\vec{v} \in \Re^k$, d and $a \in \Re$, d>0, a>=0. In this function, $\vec{v}$ is the center location of the fuzzy set, d represents the width ($\|\vec{x} - \vec{v}\|$ for $C(\vec{x})=0.5$) of the function, and $\alpha$ determines the smoothness of the function. Generally, d and a portray the grade of fuzziness of the corresponding fuzzy feature. For fixed d, the grade of fuzziness increases as $\alpha$ decreases. For fixed $\alpha$, the grade of fuzziness increases as d increases.

Accordingly, feature $S_1$ is represented by a fuzzy feature whose membership function, $\mu_{S_1}: \Re \rightarrow [0,1]$, is defined as:

$$\mu_{S_1}: R \rightarrow [0,1] = \begin{cases} \frac{1}{1 + \left(\frac{\|S_1 - S_{c1}\|}{d_1}\right)^{a_1}} & \|S_1 - S_{c1}\| < Thre \\ 0 & \text{otherwise} \end{cases}$$

where $S_{c1}$ is cluster center of fuzzy feature set, $\tilde{S}_1$, $\|S_1 - S_{c1}\|$ represents the distance between feature $S_1$ and $S_{c1}$, and Thre is an empirical parameter.

The feature $S_2$ is represented by fuzzy feature whose membership function, $\mu_{S_2}: \Re \rightarrow [0,1]$, is defined as:

$$\mu_{S_2}: R \rightarrow [0,1] = \begin{cases} \frac{1}{1 + \left(\frac{\|S_2 - S_{c2}\|}{d_2}\right)^{a_2}} & \|S_2 - S_{c2}\| < Thre \\ 0 & \text{otherwise} \end{cases}$$

where $S_{c2}$ is cluster center of fuzzy feature set $\tilde{S}_2$, and $\|S_2 - S_{c2}\|$ represents the distance between feature $S_2$ and $S_{c2}$.

An intrinsic property of such membership functions is that the farther a feature vector moves away from the cluster center, the lower the degree of membership is to the fuzzy feature. At the same time, the degrees of membership to the other fuzzy features may be increasing. This describes the gradual transition of two clusters.

A product rules and/or a summation rule may be used to combine $\mu_{S_1}$ and $\mu_{S_2}$. In these rules, the similarity is in the real interval [0,1] because $\mu_{S_1}$ and $\mu_{S_2}$ are always within [0,1].

The following sets forth the product rule:

$$\text{Similarity} = \mu_{S_1}{}^{p} * \mu_{S_2}{}^{1-p}$$

The following sets forth the summation rule:

$$\text{Similarity} = p * \mu_{S_1} + (1-p) * \mu_{S_2}$$

Turning to another process, an AdaBoost-based combination process may be used in EA Recognition. In general, the AdaBoost algorithm solves many practical difficulties of earlier boosting algorithms. AdaBoost calls a given weak or base learning algorithm repeatedly in a series of rounds $t=1 \ldots T$. One of the main ideas of the algorithm is to maintain a distribution or set of weights over the training set. The weight of this distribution on training example i on round t is denoted Dt(i). Initially, all weights are set equally, but on each round, the weights of incorrectly classified examples are increased so that the weak learner is forced to focus on the hard examples in the training set.

AdaBoost is well-known algorithm in the machine learning field, and solves questions related to classification. Herein is described the solving of combination problems using AdaBoost.

In general, online and offline scores may be considered as features, with AdaBoost applied to this feature pool, to get T weak classifiers $h_t(s_{ti})$, $t=1 \ldots T$, $i=1$ or 2. The final combination result is output as $$H(s_1, s_2) = \sum_{t=1}^{T} h_t(s_{ti}), \; s_{ti} = 1 \text{ or } 2.$$

In an alternative, neural network system, Back-Propagated Delta Rule Networks (BP) was also applied to combine online and offline recognition models. BP networks developed from the simple Delta rule in which extra hidden layers (layers additional to the input and output layers, not connected externally) are added. The network topology is constrained to be feedforward, that is, loop-free; generally connections are allowed from the input layer to the first (and possibly only) hidden layer; from the first hidden layer to the second, and so forth, from the last hidden layer to the output layer.

Figure 2:
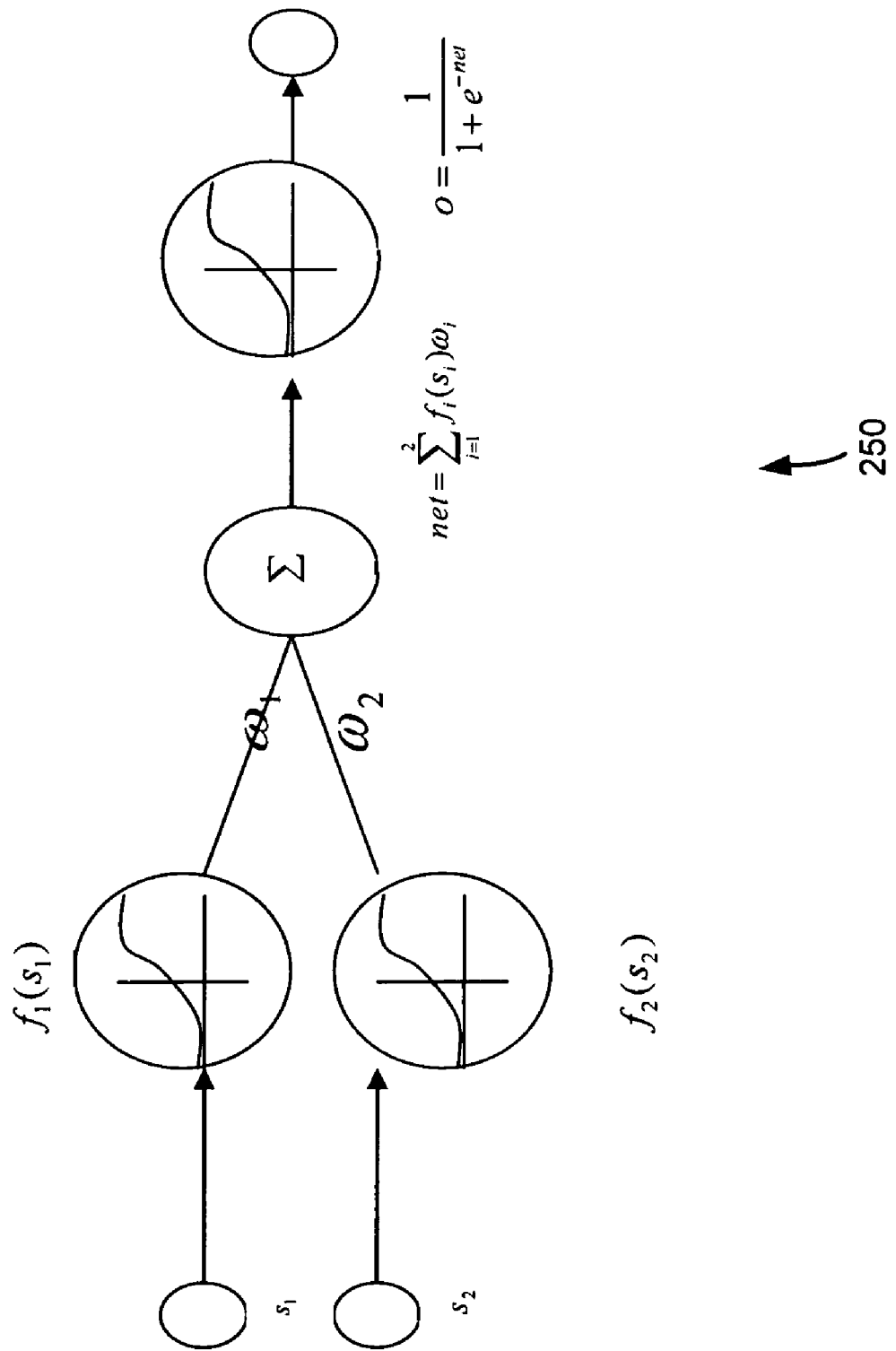
FIG. 2 is a representation of a neural network system, in which Back-Propagated Delta Rule Networks (BP) may be applied to combine online and offline recognition models.

FIG. 2 shows an example back propagation network 250. A first layer of the network has two nodes that represent the input; $s_1$ and $s_2$ respectively represent the offline and online recognition score.

A sigmoid function $f_1(x)$ and $f_2(x)$ is applied to the offline and online scores so that $f_1(s_1)$ and $f_2(s_2)$ ranges between 0 and 1.

$$f_1(x) = \frac{1}{1 + e^{-\lambda_1(x-\theta_1)}}, \; f_2(x) = \frac{1}{1 + e^{-\lambda_2(x-\theta_2)}}$$

As also shown, $f_1(s_1)$ and $f_2(s_2)$ are the outputs of a second layer. A third layer outputs the linear combination result of the second layer's outputs.

The network's final output is computed as:

$$o = \frac{1}{1 + e^{-net}}.$$

The back propagation algorithm employs gradient descent to learn the weights $\omega_1, \omega_2$ and parameters $\lambda_1, \lambda_2, \theta_1, \theta_2$ of this multilayer network.

Figure 3:
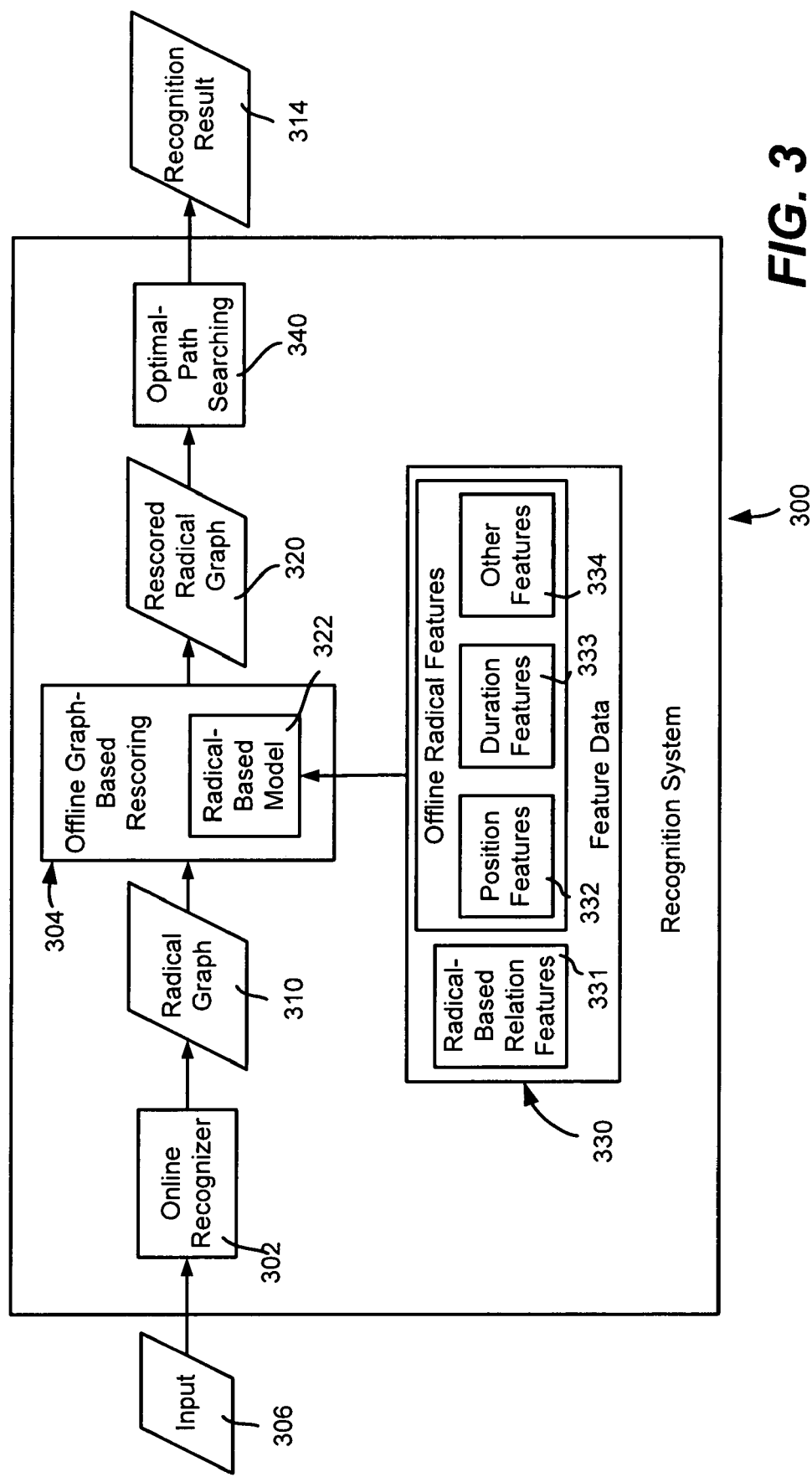
FIG. 3 shows an illustrative block diagram example of a system for combining offline and online recognition results using graph-based combination.
Figure 4:
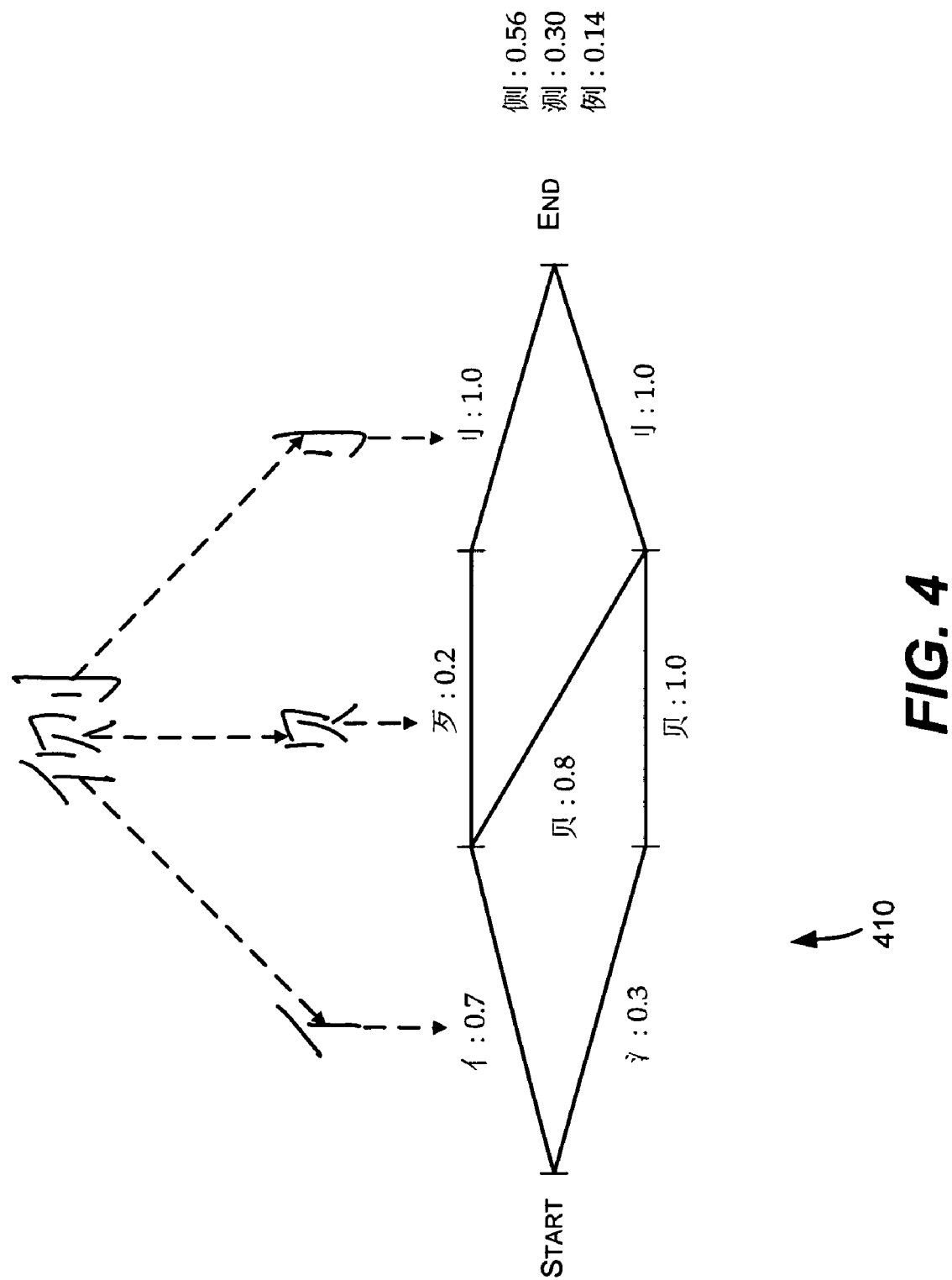
FIG. 4 is a representation of a simplified radical graph that may be generated by online recognition and rescored by offline recognition.

An alternative graph-based combination system 300 is represented in FIGS. 3 and 4. Note that unlike the combination system of FIG. 1, in which the online and offline recognition processes are separately performed and then combined, in graph-based combination, an online recognition process 302 is first performed on an input 306 to produce a resultant graph 310, which is then processed by an offline rescoring mechanism 304 into a final recognition result 314.

In one example implementation, for a written input character 306, the online HMM model is used as the recognizer 310, which decodes and generates a radical graph 310 containing multiple hypotheses and detailed score information. A simplified example of a generated radical graph 410 is shown in FIG. 4, where a radical is a common component of at least two characters.

The radical graph 310 is an intermediate result of HMM recognition. The HMM recognizer tries to separate ink of a character into several parts and recognize each part to a possible radical. In the radical graph, each edge is a recognized radical and its score of possibility.

After the radical graph 310 is obtained, each path from START to END means a character which comprises several sequential radicals in the path. A whole character model searches for a path in the graph having the highest score. The character represented by the path will be final recognition result, (or if multiple results are returned, they are ranked by their path scores).

Based on the radical graph 310, the offline rescoring model 304 rescores the graph 310 into a rescored radical graph 320. To this end, the offline rescoring model 304 includes a radical based recognition model 322, that uses feature data 330 including radical-based relation features 331, position features 332, duration features 333 and/or other features 334. Once rescored, the best hypothesis (or hypotheses if multiple results are desired) can be selected from the graph by the score via an optimal path searching mechanism 340.

Turning to an explanation of the operation of the various components, FIG. 5 represents performing online recognition (step 502) and offline recognition (step 504) separately, to provide online and offline character-level recognition results, and then combining the results (step 506) using the combiner mechanism 112 of FIG. 1. As is understood, steps 502 and 504 may be performed in any order, and/or at least some of the recognition processing represented thereby may be performed in parallel.

As represented in step 506, the combiner mechanism combines the online and offline results, and may use statistical analysis based combination, AdaBoost-based combination, or neural network-based combination on the results. Which combination type is used may depend on many factors, e.g., the processing power of the device performing the combination.

The final recognition result set is then output as represented by step 508, which may be a single best result or a group of ranked results. Note that it is also feasible to perform more than one such type of combination, and then output a result set based on a confidence level (e.g., normalized as necessary) for each combination result.

FIG. 6 represents the radical level recognition, including radical graph-based combination, in which online recognition (e.g., HMM) is performed as represented by step 602 to output a radical graph from the online results. An offline process (step 604) uses offline radical-level results to subsequently process the interim online result, e.g., rescore the radical graph as described above.

As represented in step 606, a final recognition result is then output, which may be a single best result or a set of score-ranked results. Note that it is also feasible to perform any or all of the combination types of FIG. 5 and combine the results therefrom with the results of the combined graph-based online and offline recognition model of FIG. 6, and then output a result set based on a confidence level (e.g., normalized as necessary) for each combination result.

Exemplary Operating Environment

Figure 7:
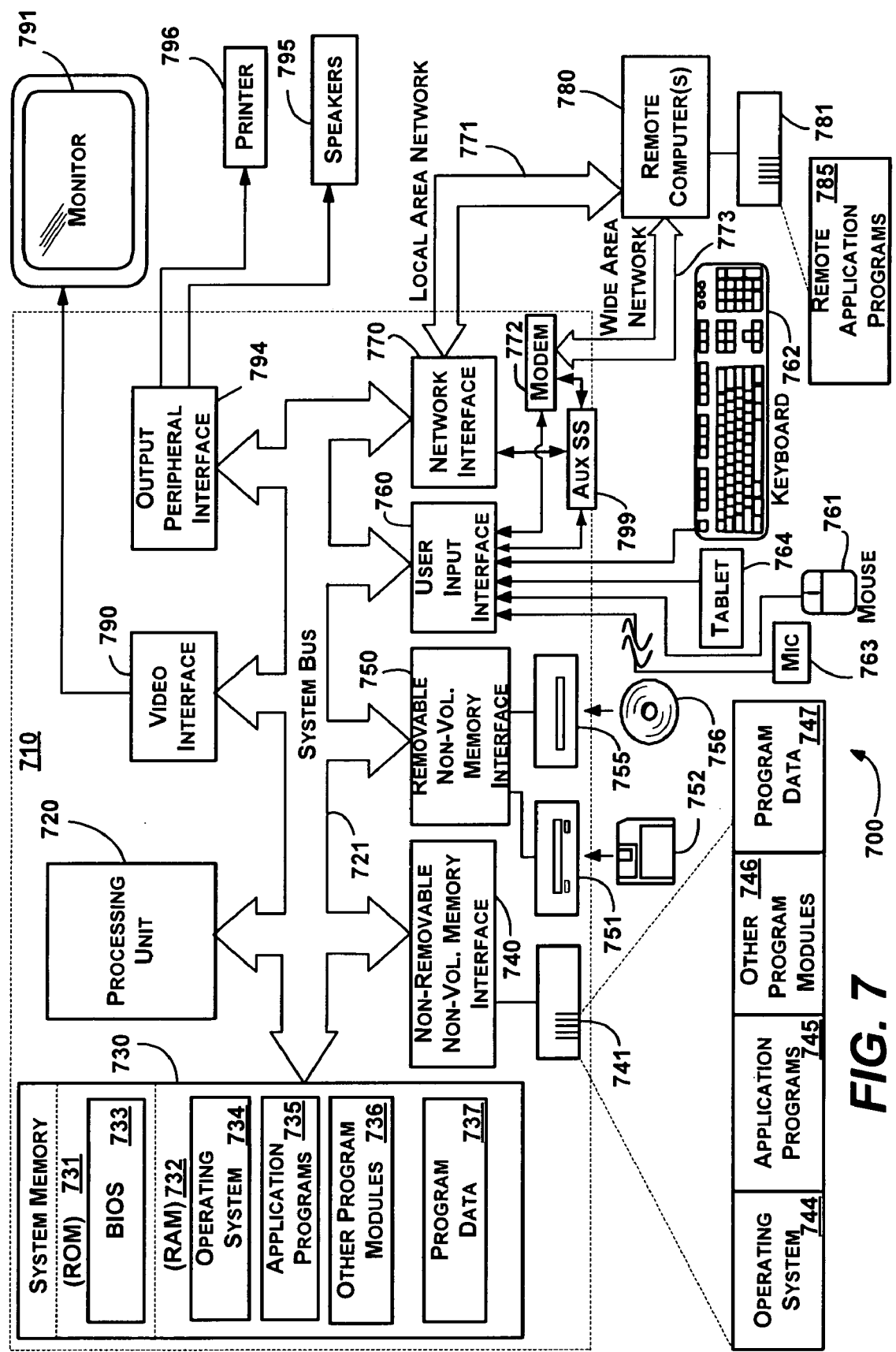
FIG. 7 shows an illustrative example of a general-purpose network computing environment into which various aspects of the present invention may be incorporated.

FIG. 7 illustrates an example of a suitable computing system environment 700 on which the recognition system 100 of FIG. 1 and/or the recognition system 300 of FIG. 3 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer storage medium that is not a signal or carrier wave per se, the at least one computer storage medium storing computer-executable instructions that, when executed by a computer, cause the computer to perform a method comprising combining online recognition scores corresponding to character or radical level recognition of handwritten input data, with offline recognition scores corresponding to character or radical level recognition of the handwritten input data, to obtain a combined recognition result, and outputting the combined recognition result.

2. The at least one computer storage medium of claim 1 wherein combining online recognition scores with offline recognition scores comprises performing online recognition to obtain an online recognition result set corresponding to scores for whole character ink data, performing offline recognition to obtain an offline recognition result set corresponding to scores for whole character ink data, and combining the online recognition result set with the offline recognition result set via a combination mechanism to obtain the combined recognition result.

3. The at least one computer storage medium of claim 2 wherein combining the online recognition result set with the offline recognition result set comprises using a statistical analysis-based process to produce the function to combine the online scores with the offline scores.

4. The at least one computer storage medium of claim 2 wherein combining the online recognition result set with the offline recognition result set comprises applying an AdaBoost algorithm to produce the function to combine the online scores with the offline scores.

5. The at least one computer storage medium of claim 2 wherein combining the online recognition result set with the offline recognition result set comprises using artificial neural network-based combination to produce the function to combine the online scores with the offline scores.

6. The at least one computer storage medium of claim 1 wherein combining online recognition scores with offline recognition scores comprises, performing online recognition via a radical recognizer to obtain online recognition scores corresponding to radical ink data, building a radical graph representing candidates based on boundary data of the radical ink and the online radical scores, performing offline recognition via a radical recognizer to obtain offline recognition scores corresponding to the radical ink, combining the online radical recognition scores with the offline radical recognition scores to obtain a new combined radical score for each candidate of each radical ink data and updating the corresponding score in the radical graph based on the new combined radical score, and processing paths in the graph to determine the combined recognition result.

7. The at least one computer storage medium of claim 6 wherein the combined recognition result comprises a single result or multiple results, and wherein processing the paths in the graph to determine the combined recognition result comprises searching for an optimal path in the graph having a highest score or ranking by their path scores.

8. The at least one computer storage medium of claim 1 wherein combining the online recognition scores with offline recognition scores comprises, recognizing the handwritten radical data as online radical scores and offline radical scores.

9. In a computing environment, a system comprising an online recognizer implemented by a computer and configured to process an handwritten input to produce first data corresponding to online recognition results, and a combination mechanism implemented by the computer and configured to process the first data and second data to output a final recognition result set, wherein an offline recognizer processes the handwritten input to produce the second data, and wherein the second data corresponds to offline recognition results.

10. The system of claim 9 wherein the online recognizer produces the first data as a first set of character level scores, and wherein the offline recognizer produces the second data as a second set of character level scores.

11. The system of claim 10 wherein the combination mechanism determines a function that mathematically processes the scores to produce the final recognition result set.

12. The system of claim 11 wherein the combination mechanism comprises a statistical analysis-based process to determine the function that mathematically combines the scores.

13. The system of claim 11 wherein the scores correspond to features, and wherein the combination mechanism comprises an AdaBoost process to determine the function that mathematically combines the scores.

14. The system of claim 11 wherein the combination mechanism comprises an artificial neural network-based combination process.

15. The system of claim 14 wherein the artificial neural network-based combination process comprises a back propagation algorithm.

16. The system of claim 9 wherein the online recognizer produces the first data as radical level data used in constructing a radical graph, wherein the offline recognizer produces the second data as radical level data, and wherein the combination mechanism uses the second data to re-score the radical graph data in the graph, and further comprising a search mechanism that processes paths in the graph to produce the final recognition result set.

17. The system of claim 9 wherein the offline recognizer produces the second data via radical-based relation features, position features, or duration features, or any combination of radical-based relation features, position features, or duration features.

18. In a computing environment, a method comprising:
receiving, by a computer, handwritten input data;
performing online recognition of the handwritten input data to produce online recognition scores;
performing, by the computer, offline recognition of the handwritten input data to produce offline recognition scores; and
outputting a combined recognition result based on the online recognition scores and the offline recognition scores.

19. The method of claim 18 wherein the online and offline recognition scores comprise character level recognition scores associated with hypotheses, and wherein outputting the combined recognition result comprises combining online scores with offline scores using a combining function determined by a statistical analysis based process, an AdaBoost process, or an artificial neural network-based process.

20. The method of claim 18 wherein the online and offline recognition scores comprise radical level recognition scores, and further comprising, generating a radical graph from the online radical recognition scores, rescoring the radical graph using the offline radical recognition scores, and further comprising, searching paths in the radical graph to determine the combined recognition result.

* * * * *